(12) United States Patent
Schmautz et al.

(10) Patent No.: US 8,591,209 B2
(45) Date of Patent: Nov. 26, 2013

(54) PUMP FOR A VEHICLE BRAKE SYSTEM HAVING A VALVE

(75) Inventors: Oliver Schmautz, Oberstenfeld (DE); Marc Zimmermann, Oberstenfeld (DE)

(73) Assignee: Robert Bosch GmbH, Stuttgart (DE)

( * ) Notice: Subject to any disclaimer, the term of this patent is extended or adjusted under 35 U.S.C. 154(b) by 680 days.

(21) Appl. No.: 12/446,074

(22) PCT Filed: Sep. 21, 2007

(86) PCT No.: PCT/EP2007/060052
§ 371 (c)(1),
(2), (4) Date: Aug. 16, 2010

(87) PCT Pub. No.: WO2008/046717
PCT Pub. Date: Apr. 24, 2008

(65) Prior Publication Data
US 2010/0310395 A1    Dec. 9, 2010

(30) Foreign Application Priority Data
Oct. 17, 2006  (DE) .......................... 10 2006 048 903

(51) Int. Cl.
*F04B 39/10*    (2006.01)
*F04B 53/12*    (2006.01)

(52) U.S. Cl.
USPC ......................................................... 417/549

(58) Field of Classification Search
USPC .......................... 417/470, 471, 540, 549, 552
See application file for complete search history.

(56) References Cited

U.S. PATENT DOCUMENTS

| | | | | |
|---|---|---|---|---|
| 5,823,639 A | * | 10/1998 | Zinnkann et al. | 303/116.4 |
| 6,079,961 A | * | 6/2000 | Schuller et al. | 417/549 |
| 6,146,115 A | * | 11/2000 | Alaze | 417/549 |
| 6,171,083 B1 | * | 1/2001 | Schuller | 417/549 |
| 6,327,964 B1 | * | 12/2001 | Schuller et al. | 92/248 |
| 6,334,762 B1 | * | 1/2002 | Hauser et al. | 417/569 |
| 6,361,295 B2 | * | 3/2002 | Schuller et al. | 417/549 |
| 6,622,751 B1 | | 9/2003 | Beck et al. | |
| 6,786,232 B2 | * | 9/2004 | Schuller et al. | 137/543.17 |
| 7,004,733 B2 | * | 2/2006 | Schepp et al. | 417/470 |
| 2001/0002978 A1 | * | 6/2001 | Siegel et al. | 417/470 |
| 2002/0155008 A1 | * | 10/2002 | Hauser et al. | 417/313 |
| 2003/0047993 A1 | | 3/2003 | Furuya et al. | |
| 2006/0177326 A1 | * | 8/2006 | Harada et al. | 417/470 |
| 2006/0198738 A1 | * | 9/2006 | Schlitzkus et al. | 417/312 |
| 2008/0307955 A1 | * | 12/2008 | Schepp et al. | 92/132 |

FOREIGN PATENT DOCUMENTS

| | | |
|---|---|---|
| DE | 4243667 A1 | 6/1994 |
| WO | 9940323 A1 | 8/1999 |
| WO | 2006013142 A1 | 2/2006 |

* cited by examiner

*Primary Examiner* — Charles Freay
*Assistant Examiner* — Amene Bayou
(74) *Attorney, Agent, or Firm* — Maginot, Moore & Beck

(57) ABSTRACT

The invention relates to a pump having a valve through which a fluid can optionally flow. The valve is embodied by a cavity for displaceably guiding a spherical blocking body, and a valve seat that is spatially adapted to the spherical shape of the blocking body. A free space protruding radially outwards from the spherical body is located downstream, directly behind the valve seat, for temporarily receiving the fluid which flows through the valve seat.

18 Claims, 3 Drawing Sheets

PUMP FOR A VEHICLE BRAKE SYSTEM HAVING A VALVE

CROSS-REFERENCE TO RELATED APPLICATION

This application is a 35 USC 371 application of PCT/EP 2007/060052 filed on Sep. 21, 2007.

BACKGROUND OF THE INVENTION

1. Field of the Invention

The invention relates to a pump, in particular a piston pump, having a valve through which a fluid can selectively flow and which has a receptacle for movably guiding a spherical blocking body and has a valve seat adapted three-dimensionally to the spherical shape of the blocking body.

2. Description of the Prior Art

Piston pumps are used, among other purposes, in known vehicle brake systems, especially anti-lock brake systems (ABS). There, they serve to control the pressure in wheel brake cylinders. In the ABS, they are provided for instance for returning brake fluid from one or more wheel brake cylinders to a master cylinder. Often, the ABS functions in combination with traction control (TC), which likewise makes use of piston pumps. A further known system, known as an electronic stability program (ESP), improves the driving safety by a further increment over ABS and TC by varying the crosswise dynamics of the vehicle. In this system as well, piston pumps are employed.

Known pumps used particularly for vehicle brake systems have valves, for controlling the fluid flow direction through the pump, which are as a rule embodied as check valves acted upon springs and serve as inlet and outlet valves. Preferably, the check valves acted upon by springs are embodied in the form of ball-seat valves, including a blocking body in the form of a ball and a valve seat adapted three-dimensionally to the spherical shape of the blocking body. In the case of the ball-seat valves acting as an outlet valve, the ball is usually guided in a receptacle embodied in an outlet valve cap of the known piston pumps. When fluid flows out through an outflow bore embodied in the piston pumps, the ball opens the outlet region in accordance with the following principle. The ball migrates tangentially out of the sealing seat in the direction of the outlet valve cap bottom and the outflow bore. The ball in this case opens only minimally, since a dynamic pressure develops upstream of the ball. In addition, the ball is drawn into the outflow groove, directly adjoining the valve seat, by the outflow of the fluid. Overall, in the pump interior of known piston pumps, a high dynamic pressure develops, which results in high stress on components. Moreover, because of what is described above, known piston pumps have high driving torque and accordingly a high system output.

OBJECT AND SUMMARY OF THE INVENTION

The object of the invention is to disclose a pump which can be used in particular for vehicle brake systems and in which during operation, only a slight stress on components occurs, and which furthermore has only slight driving torque and a low system output.

This object is attained according to the invention by the pump referred to at the outset, in which directly downstream of the valve seat, a free space protruding radially outward from the spherical blocking body is embodied for the sake of briefly receiving fluid passing through the valve seat.

As a result of the free space embodied according to the invention, when fluid flows through the valve, an outflow cross section develops, which is markedly increased compared to the outflow cross sections of known pumps. A throttling effect resulting from an overly small outflow cross section is thus avoided according to the invention. In this way, in the pump according to the invention no dynamic pressure develops, which is associated with a markedly reduced stress on the system and its components.

In an advantageous refinement of the invention, downstream of the valve seat, an outflow line is provided, and the free space is embodied essentially diametrically opposite the outflow line. Fluid from the pump according to the invention can flow through the opened valve into the outflow line and thus be carried out of the pump. Thus according to the invention, a valve-controlled pump outlet can be created with which no dynamic pressures that put stress on components are associated.

In a practical refinement of the invention, the free space is formed by a concave cavity of the component that forms the receptacle. The component forming the receptacle may for instance be an outlet valve cap.

Preferably, the free space is formed by a convex peripheral shaping of the component forming the receptacle. A convex peripheral shaping of the component forming the receptacle can be achieved with little production effort or expense. Alternatively, the free space can also be formed by a phase designed on the component forming the receptacle. In the same way as a convex peripheral shaping, a phase can also be attained with little production effort and hence economically.

In a further practical refinement of the invention, the free space has a depth which amounts to at least 25% of the diameter of the spherical blocking body. By means of a free space depth thus specified according to the invention, the throttling effect known from the prior art associated with the dynamic pressure can be effectively prevented, and at the same time, known fundamental functions of the valve, especially a fluidically optimal outflow before the equator of the ball can be maintained. For that purpose, the free space according to the invention should preferably have a maximum height that amounts to at least 25% of the diameter of the spherical blocking body.

In an alternative practical refinement of the invention, the valve seat has a valve seat opening with a predetermined mean diameter, and the free space has a depth which amounts to at least 33% of the predetermined mean diameter, in order in particular to maintain the known fluidically advantageous fundamental functions of the valve. For that purpose, the free space should according to the invention preferably have a maximum height which amounts to at least 33% of the predetermined mean diameter.

In an especially practical refinement of the invention, the pump has a piston, which is guided displaceably in a housing portion of the piston pump, and the piston has a receiving part for receiving an inlet valve, a sealing element, adjoining the receiving part, for sealing the piston off from the housing portion, and a piston rod, adjoining the sealing element, and the sealing element is embodied in one piece with the receiving part.

Accordingly, the sealing element is embodied in one piece with the receiving part. This has the advantage that in a distinction from pumps known from the prior art, which are used especially for vehicle brake systems, the functions of the sealing element and of the receiving part provided for receiving an inlet valve are performed by only a single component. Thus according to the invention, compared to the known versions, one less component is needed, and as a consequence, assembly and disassembly of the pump of the invention can be done quite simply, and the chain of tolerances is shortened markedly. Moreover, by the economy from using one less component achieved according to the invention, the production costs of the pump can be reduced markedly. Finally, the pump according to the invention, because of the economy of one component, can be made markedly smaller than known pumps.

Preferably, the inlet valve has a valve seat, which is embodied on the piston rod. This structural embodiment according to the invention makes simple assembly and disassembly of the pump possible. For instance, for disassembling the pump, the piston rod adjoining the sealing element can be removed from the sealing element. Next, the inlet valve, which is preferably embodied as a seat valve, can be removed along with its individual components, for instance including a blocking body and a spring element, from the receiving part embodied in one piece with the sealing element without major effort. Finally, the sealing element, on which the receiving part is embodied in one piece and which is received longitudinally movably in the cylinder of the pump, can easily be removed from the cylinder.

In a further advantageous refinement of the invention, a prestressing element, preferably in the form of a helical spring, is provided, which rests on the sealing element and with which the piston is forced in the direction out of the housing portion. The prestressing force transmitted from the prestressing element to the sealing element keeps the piston in an outer position at all times. In this way, according to the invention, the outer face end of the piston can be pressed against the eccentric element of an eccentric drive, in order thus to convert a translational driving motion, furnished by the eccentric drive, into a reciprocating pumping motion of the piston. By means of the prestressing element, the pump of the invention can be used in conjunction with eccentric drives that are preferentially used in brake systems for driving the pumps.

In a practical refinement of the invention, the sealing element is embodied in the form of a sealing ring having a sealing ring opening, and the piston rod is received in the sealing ring opening, and the piston rod is preferably received with a clearance fit in the sealing ring opening. By means of a clearance fit, the piston rod can be centered in the sealing ring opening without problems. Moreover, a clearance fit makes problem-free release of the piston rod from the sealing ring opening, which is necessary for disassembly purposes, possible.

BRIEF DESCRIPTION OF THE DRAWINGS

Below, exemplary embodiments of a pump according to the invention are described in further detail in conjunction with the schematic drawings, in which.

DESCRIPTION OF THE PREFERRED EMBODIMENTS

Figure 1:
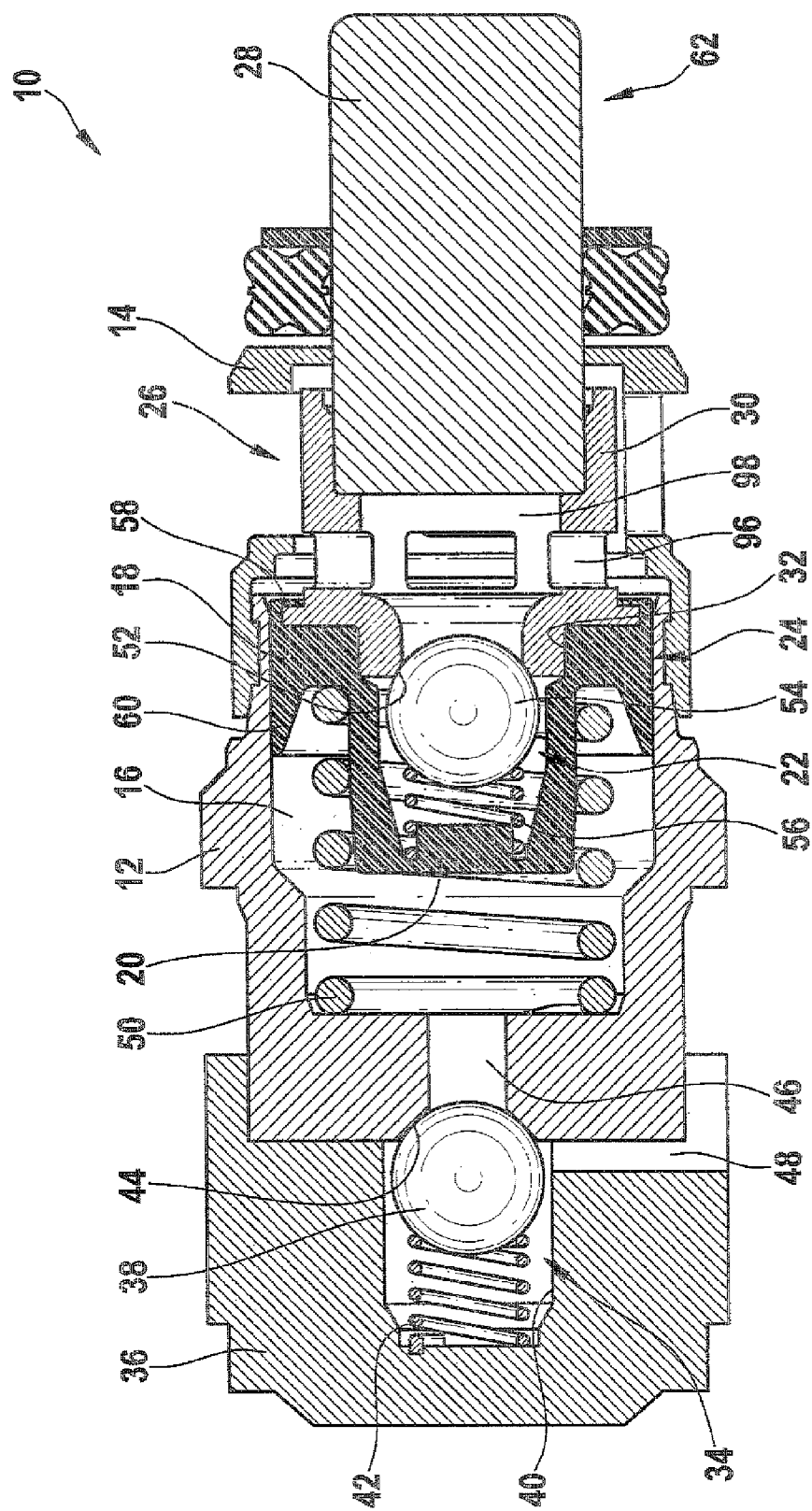
FIG. 1 shows a longitudinal section through a pump according to the invention.

FIG. 1 shows a pump according to the invention in the form of a piston pump 10. The piston pump 10 includes two housing portions 12 and 14, and in the housing portion 12, a cylinder bore 16 is embodied, in which a piston 26 is guided displaceably. The piston 26 includes a sealing element in the form of a sealing ring 18; a receiving means 20, for an inlet valve 22 embodied as a ball seat valve, which receiving means 20 is embodied in one piece with the sealing ring 18 and in the present case is embodied as an inlet valve cap; and a piston rod 62, which adjoins the sealing ring 18. The piston rod 62 is embodied in two parts and includes two piston rod elements 28, 30; the piston rod element 28 is received firmly in the piston rod element 30 by means of a press fit, in order to create a nonpositive connection between the two piston rod elements 28, 30. Because of the two-part embodiment of the piston rod 62 provided, a piston rod 62 that is economical to produce can be attained, since according to the invention an economical rodlike piston rod element 28 is connected to a piston rod element 30 which can be furnished quite economically in the form of a plastic injection-molded part, a turned part, a cast part, or a cold-formed part.

The receiving means 20, designed as an inlet valve cap, and the sealing ring 18 together form a one-piece valve cap/sealing ring combination 24. The piston rod element 30, for connecting the piston rod 62 to the sealing ring 18, is received in the sealing ring opening 32 of the sealing ring 18.

The piston pump 10 furthermore has an outlet valve 34, embodied as a ball seat valve, which is disposed inside an outlet valve cap 36, and a ball 38 of the ball seat valve 34 is guided in a receptacle 40 embodied in the outlet valve cap 36. The outlet valve cap 36 may be manufactured in part by metal-cutting machining or cold-forming. A helical spring 42 braced on the cap bottom presses the ball 38 against a valve seat 44, which is embodied in the housing portion 12 of the piston pump 10 and which adjoins an outlet hole 46 embodied in the housing portion 12. Brake fluid flowing from the outlet hole 46 through the outlet valve 34 flows in the direction of the pump outlet (not shown) via an outflow bore in the form of a radial conduit 48 between the outlet valve cap 36 and the housing portion 12.

A prestressing element in the form of a helical spring 50 is also disposed in the cylinder bore 16 embodied in the housing portion 12; it rests with one end on the sealing ring 18 and is braced with the other end on the bottom of the housing portion 12. The helical spring 50 is prestressed, in order to press the two-part piston rod 62, via the sealing ring 18 on which the piston rod 62 rests with its face end disposed inside the piston pump 10, against the circumference of the eccentric element of an eccentric drive not shown). Thus the outer face end of the piston rod element 28 can be kept always in contact with the eccentric element. Driving the eccentric element to rotate causes the entire piston 26 to execute an axially reciprocating stroke motion, which in a known manner causes brake fluid to be pumped.

The valve seat 52 of the ball inlet valve 22, which can be made for instance by ball embossing or stamping, is embodied on the face end of the piston rod element 30. This embodiment according to the invention of the valve seat 52 on the piston rod element 30 of the piston rod 62, in combination with the one-piece embodiment according to the invention of the sealing ring 18 with the receiving means 20 designed as an inlet valve cap, in the form of a valve cap/sealing ring combination 24, offers marked advantages in assembly and disassembly of the piston pump 10. For disassembly of the piston pump 10, the piston rod element 30, received with a clearance fit in the sealing ring opening 32, must be drawn out of the sealing ring opening 32. The clearance fit provided according to the invention makes problem-free release of the piston rod element 30 from the sealing ring 18 possible here. The individual components of the inlet valve 22, that is, the ball 54 and the helical spring 56, can then be removed easily from the receiving means 20. Finally, after the one-piece valve cap/sealing ring combination 24 is removed from the cylinder bore 16, the helical spring 50 can be removed from the cylinder bore 16. Assembling the piston pump 10 proves to be correspondingly simple; the clearance fit provided enables problem-free centering of the piston rod element 30 in the sealing ring opening 32.

Also on the sealing ring 18, a snap connection in the form of a snap lug 58 is embodied, which embraces a shoulder embodied on the piston rod element 30. By means of the snap lug 58, the piston rod 62 can be retained on the sealing ring 18 during the assembly of the piston pump 10, and in particular during mounting on the cylinder bore 16, thus simplifying the assembly of the piston pump 10 of the invention substantially. The retention function thus attained according to the invention can alternatively be attained by means of a thermal deformation, after the valve cap/sealing ring combination 24 has been slipped onto the piston rod element 30. According to the invention, the snap lug 58 takes on only the described retention function that is advantageous for assembly purposes. During the operation of the piston pump 10, the spring force of the helical spring 50 assures that the valve cap/sealing ring combination 24 rests permanently on the piston rod element 30 in the axial direction, despite the clearance fit that is advantageous for assembly purposes. Moreover, the snap lug 58 has a protective effect between the cylinder bore 16 and the piston rod element 30. A sealing lip 60 is also embodied on the sealing ring 18 of the valve cap/sealing ring combination 24; it closes off the cylinder chamber between the piston 26 and the cylinder bore 16 in a radially pressure-tight fashion.

Finally, the piston pump 10 has a radial bore 96, embodied in the piston rod element 30, and a central axial bore 98, through which fluid from outside the piston pump can flow through the inlet valve 22.

Figure 2A:
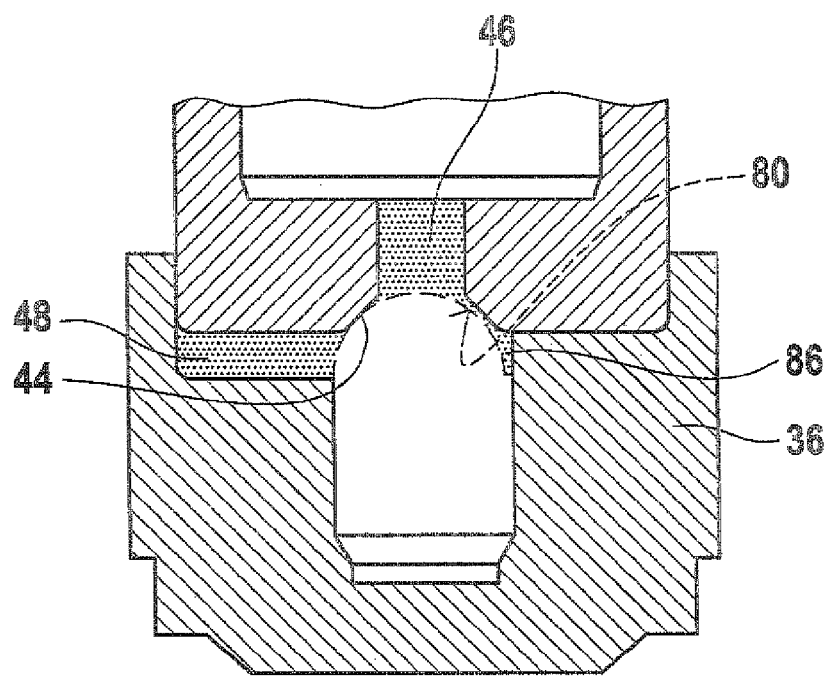
FIG. 2a shows a longitudinal section of the receptacle and of the valve seat of an outlet valve of a piston pump known from the prior art.
Figure 2B:
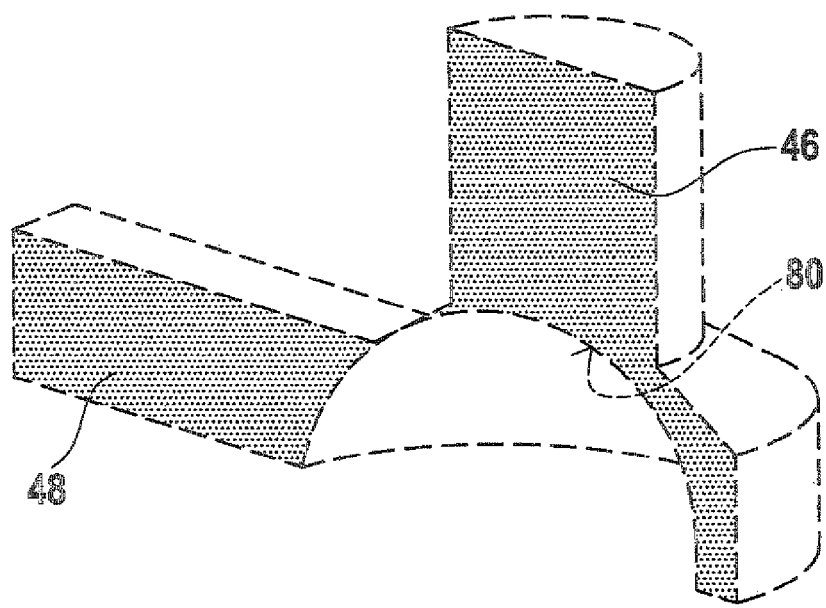
FIG. 2b is a three-dimensional view of the outflow region, resulting from FIG. 2a, for the outlet valve.

FIG. 2*a* shows an outlet valve cap or a receptacle and a valve seat of the outlet valve of a known piston pump, and a three-dimensional view of the outflow region that results for the outlet valve is shown in FIG. 2*b*.

Figure 3A:
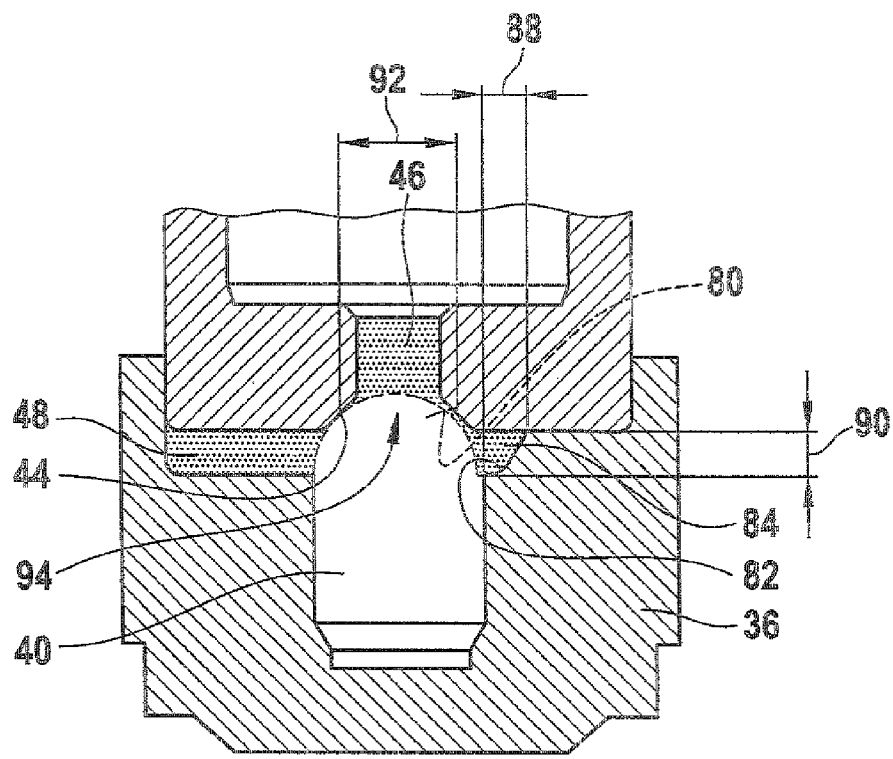
FIG. 3a shows a longitudinal section of the receptacle and of the valve seat of an outlet valve of a piston pump according to the invention.
Figure 3B:
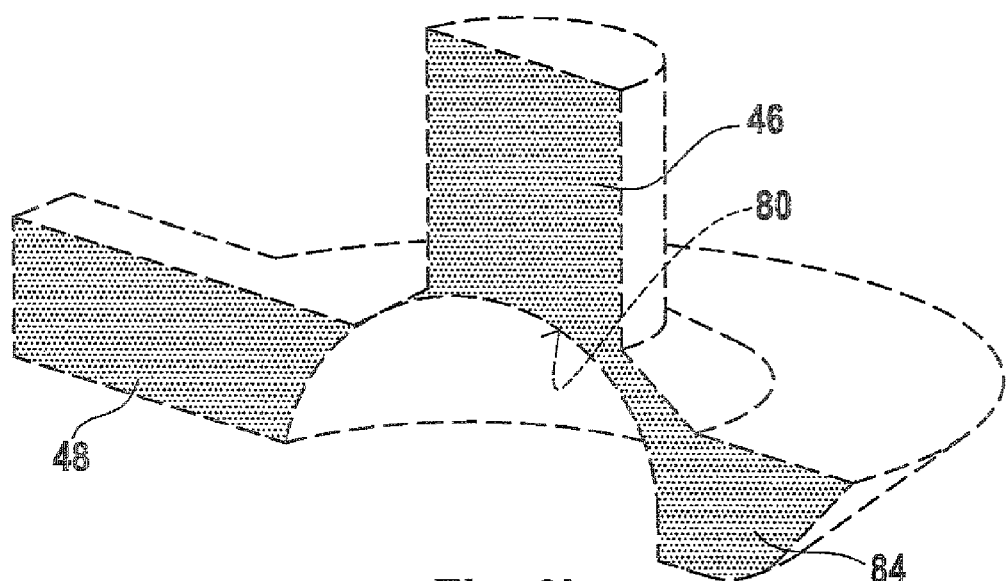
FIG. 3b is a three-dimensional view of the outflow region, resulting from FIG. 3a, for the outlet valve.

FIG. 3*a* shows the outlet valve cap 36 and the valve seat 44 of the outlet valve 34 of the piston pump 10 of the invention, and a three-dimensional view of the outflow region that results for the outlet valve 34 is shown in FIG. 3*b*.

In FIGS. 2*a*, 2*b*, 3*a* and 3*b*, the regions that when there is a flow through the outlet valve 34 are filled with flowing fluid are indicated schematically by dotted shading.

A circular-cylindrical receptacle 40 (shown in FIG. 3*a*), in which the ball 38 (FIG. 1) is guided in FIGS. 2*a* through 3*b*, of the outlet valve 34 is embodied in the outlet valve cap 36 of the piston pump 10 of the invention. In the outlet valve cap 36 of the piston pump 10 of the invention, a free space protruding radially outward from the ball 38 is embodied, in order, when there is a flow through the outlet valve 34, to briefly receive the fluid passing through the valve seat 44 and an outflow cross section face 80. The free space 84 is embodied essentially diametrically opposite an outflow line 48 leading out of the receptacle 40, and fluid from the piston pump 10 of the invention can flow via the opened outlet valve 34 into the outflow line 48 and thus can flow out of the piston pump.

The free space 84 (see FIG. 3*a*) is formed by a concave cavity 82 of the outlet valve cap 36 and can alternatively also be embodied as a chamfer, a convex radius, or a groove.

The free space 84, which is increased in size compared to the prior art (see FIG. 2*a*), has the consequence that a throttling effect from a backup of fluid downstream of the valve seat 44 is prevented. As a result, the dynamic pressure in the pump interior is lowered, which results in reduced system stress and component stress and consequently effects a reduction in the driving torque and the system output. The free space 84 embodied in the outlet valve cap 36 has no effect on the fundamental functions of the ball seat valve, and in particular an outflow upstream of the ball equator is achieved. A minimal opening, known from the prior art, of the ball, because of the dynamic pressure developing downstream of the ball, is avoided by the free space 84 of the invention. In particular, this prevents the ball from being drawn into an outflow groove 86 (see FIG. 2*a*), as is the case in the known version, by the outflow of brake fluid and the associated local pressure reduction.

The foregoing relates to the preferred exemplary embodiments of the invention, it being understood that other variants and embodiments thereof are possible within the spirit and scope of the invention, the latter being defined by the appended claims.

The free space 84, according to the invention, has a depth 88, which amounts to at least 25% of the diameter of the ball, and also has a height 90, which amounts to at least 25% of the diameter of the spherical blocking body. By means of this kind of dimensioning, specified according to the invention, of the free space 84, the throttling effect known from the prior art, with the associated dynamic pressure, can be effectively prevented, and at the same time, known fundamental functions of the outlet valve 34, in particular a fluidically optimal outflow before the ball equator, can be maintained. Alternatively, the advantageous dimensions of the free space 84 can also be referred to the mean diameter 92 of the valve seat opening 94; in the present case, a free space depth 88, which amounts to at least 33% of the mean diameter, and a free space height 90, which amounts to at least 33% of the predetermined mean diameter, represent advantageous dimensions of the free space 84.

The invention claimed is:

1. A piston pump, comprising:
   a housing portion having (i) a first bore structure defining a bore, and (ii) a second bore structure defining a housing outlet passage positioned in fluid communication with said bore, (iii) a terminal end surface, and (iv) a valve seat extending between said terminal end surface and said second bore structure;
   an outlet valve cap including a cavity structure defining a cavity, said second bore structure and said valve seat being configured and arranged to place said bore in fluid communication with said cavity;
   a spherical blocking body positioned in said cavity;
   a spring arranged and configured to bias said spherical blocking body into contact with said valve seat,
   wherein said cavity structure includes (i) a receptacle surface defining a receptacle, said spring being positioned in said receptacle, (ii) a plateau surface extending from said receptacle surface, (iii) a ramp surface extending from said receptacle surface, (iv) a ledge surface extending from said ramp surface, and
   wherein said housing portion is positioned in relation to said outlet valve cap such that said terminal end surface abuts said ledge surface so that (i) a free space is defined between said terminal end surface and said ramp surface, and (ii) an outflow passage is defined between said terminal end surface and said plateau surface.

2. The piston pump of claim 1, further comprising:
a piston, which is guided displaceably in the housing portion of the piston pump, the piston including (i) a receiving part for receiving an inlet valve, (ii) a sealing element adjoining the receiving part and sealing the piston off from the housing portion, and (iii) a piston rod adjoining the sealing element,
wherein the sealing element and the receiving part are a one-piece member, the inlet valve has a second valve seat which is disposed on the piston rod, and the piston rod has an outward extending flange surrounded by the sealing element to secure the sealing element to the piston rod.

3. The piston pump as defined by claim 2, wherein a prestressing element rests on the sealing element and with which the piston is urged in an axial direction away from the from the outlet valve cap.

4. The piston pump as defined by claim 2, wherein the sealing element includes a sealing ring having a sealing ring opening, and the piston rod is received in the sealing ring opening.

5. The piston pump as defined by claim 3, wherein the prestressing element includes a helical spring.

6. The piston pump of claim 1, wherein:
said housing outlet passage defines a central axis,
a plane intersects said spherical blocking body so as to divide said spherical body into two equal parts,
said plane is oriented perpendicular to said central axis, and
said spring is located on a first side of said plane and said free space is located on a second opposite side of said plane.

7. The piston pump of claim 1, wherein:
said housing outlet passage defines a central axis,
a plane intersects said spherical blocking body so as to divide said spherical body into two equal parts,
said plane is oriented perpendicular to said central axis, and
said spring is located on a first side of said plane and said outflow passage is located on a second opposite side of said plane.

8. The piston pump of claim 7, wherein said free space is also located on the second opposite side of said plane.

9. The piston pump of claim 1, wherein:
said housing outlet passage defines a central axis,
said spherical blocking body possesses a diameter,
said free space possesses a maximum depth extending perpendicular to said central axis, and
a ratio of said maximum depth to said diameter is greater than or equal to 0.25.

10. The piston pump as defined by claim 9, wherein the ratio of said maximum depth to said diameter is greater than or equal to 0.33.

11. The piston pump as defined by claim 10, wherein the ratio of said maximum height to said diameter is equal to at least 0.33.

12. The piston pump of claim 1, wherein:
said housing outlet passage defines a central axis,
said spherical blocking body possesses a diameter,
said free space possesses a maximum height extending parallel to said central axis, and
a ratio of said maximum height to said diameter is equal to at least 0.25.

13. The piston pump as defined by claim 12, wherein the ratio of said maximum height to said diameter is equal to at least 0.33.

14. The piston pump of claim 1, wherein:
said housing outlet passage defines a central axis,
said spherical blocking body possesses a diameter,
said free space possesses (i) a maximum height extending parallel to said central axis, and (ii) a maximum depth extending perpendicular to said central axis,
a first ratio of said maximum height to said diameter is greater than or equal to 0.25, and
a second ratio of said maximum depth to said diameter is greater than or equal to 0.25.

15. The piston pump of claim 1, wherein said ramp surface has a concave curvature such that said free space is defined as a concave cavity.

16. The piston pump of claim 1, wherein said ramp surface has a convex curvature such that said free space is defined as a convex cavity.

17. The piston pump of claim 1, wherein said ramp surface has a substantially flat cross-section defining a chamfer between said receptacle surface and said ledge surface such that said free space is defined as a cavity having a triangular cross-section.

18. The piston pump of claim 1, wherein said free space is defined as a groove between said terminal end surface and said ramp surface.

* * * * *